UNITED STATES PATENT OFFICE.

HOWARD J. GREENE, OF PROVIDENCE, RHODE ISLAND.

PRIMING PAINT COMPOSITION.

1,150,516.  Specification of Letters Patent.  Patented Aug. 17, 1915.

No Drawing.  Application filed January 9, 1914.  Serial No. 811,189.

*To all whom it may concern:*

Be it known that I, HOWARD J. GREENE, a citizen of the United States, residing at Providence, in the county of Providence and State of Rhode Island, have invented certain new and useful Improvements in Priming Paint Compositions, of which the following is a specification.

This invention relates to the class of liquid coating composition, and pertains especially to the class of paint compositions known as primers.

The object of the invention is to provide a priming paint composition which shall preserve and enhance the protective action of the usual paint coatings applied to the first or primer coat, and which shall form an adhesive base for the usual paint coatings.

A further object of the invention is to provide a paint composition to be applied, as the first coat or primer, to wood and especially such as undried, resinous, or sappy wood, for forming an adhesive base for the usual paint coats, and for preventing the usual injury, imperfection, deterioration and destruction of the ordinary paint coat or coats.

It is well known that, by reason of the peculiar nature of such woods as cypress, various pines, and the variety of fir woods and the like, they present the most difficult propositions for satisfactory painting, and while the primer composition is intended especially for such woods, it will be found advantageous and equally desirable in repainting or renewing old painted wood work the surface of which is in such condition as to be incapable of having the usual renewal coats hold or remain firmly adhered to such surfaces.

In the use of the usual or ordinary oil paints it has been found that, in painting undried or unseasoned wood, or wood which is, by nature resinous or sappy, the paint will not hold or set to the wood, and the coatings soon become cracked, blistered, and otherwise so impaired as to be worthless. This is especially true under ordinary conditions when the painted wood is exposed to the elements, or to heat or to strong sun rays, for the reason that, the pitch, resin, or sap which exudes from such woods will penetrate the usual or commonly used primers and paint coatings. It is, therefore, the purpose of this invention, to furnish a first coat or primer which will form an adhesive and an impervious base for and prevent injury or destruction of the usual or ordinary paint coatings, and which will overcome the objections and disadvantages usually encountered therein and in repainting old wooden structures.

Various other practical advantages and improved results are attainable in the application of this priming composition now to be particularly described.

In carrying out my invention I employ benzol, or preferably homologues or derivatives of benzol, *i. e.*—xylol, or any of the xylenes, as the leading or controlling element of the composition, with proper proportions of oil, turpentine, drier and pigments as desired or as occasion may demand. For example, the following formula (by weight) will be found in proper relative proportions for producing satisfactory results:—white lead 100 parts, zinc oxid 50 parts, silica 100 parts, linseed oil 180 parts, drier 10 parts, turpentine 10 parts, and commercial xylol or xylene 30 parts. This formula is merely illustrative of my invention and may be varied as to proportions, character of pigment, and character of benzol derivative, to which coloring matter may be added when desired, but the relative proportions of benzol or its derivatives should be maintained.

The composition is applied with a brush as usual and should constitute the first application or primer for the usual paint coat or coats to follow thereon.

It has been found that by making benzol or xylol or their derivatives, as herein set forth, the leading or controlling element in a paint composition, a priming paint is obtained which has not, to my knowledge, heretofore been produced; that one application of this primer is sufficient to prevent the ordinary paint coat or coats applied thereafter from becoming effected by the condition or character of any wood to which the application of the primer is made; and that the primer forms an unusually desirable and effective adhering base for the paint.

I am aware that benzol has been used in paint compositions, but such use has been merely as one of a number of possible thinning materials in an ordinary or finishing paint, and has no relation to my particular use of benzol and its derivatives.

I do not wish to be understood as confining the invention to any particular quantity of benzol, or to any particular quantity of xylol or xylene, nor do I wish to be understood as limiting the invention to any particular ingredients which may be associated with benzol, xylol, or xylene, as vehicles for compounding the primer composition, but reserve to myself the right to make such changes, additions and substitutions in the application of benzol and its derivatives, which may be considered within the scope of my invention as set forth in the claim to follow.

Having thus described my invention what I claim as new and desire to secure by Letters Patent is:—

A wood coating composition forming an impervious base for the application of paint, said composition being composed of white lead, zinc oxid, silica, linseed oil, drier, turpentine, and a controlling compound of benzol and xylol, in substantially the proportions as specified.

In witness whereof I hereunto set my hand in the presence of two witnesses.

HOWARD J. GREENE.

Witnesses:
 EDWARD A. STOCKWELL,
 R. F. LANSDALE.